United States Patent Office 3,540,103
Patented Nov. 17, 1970

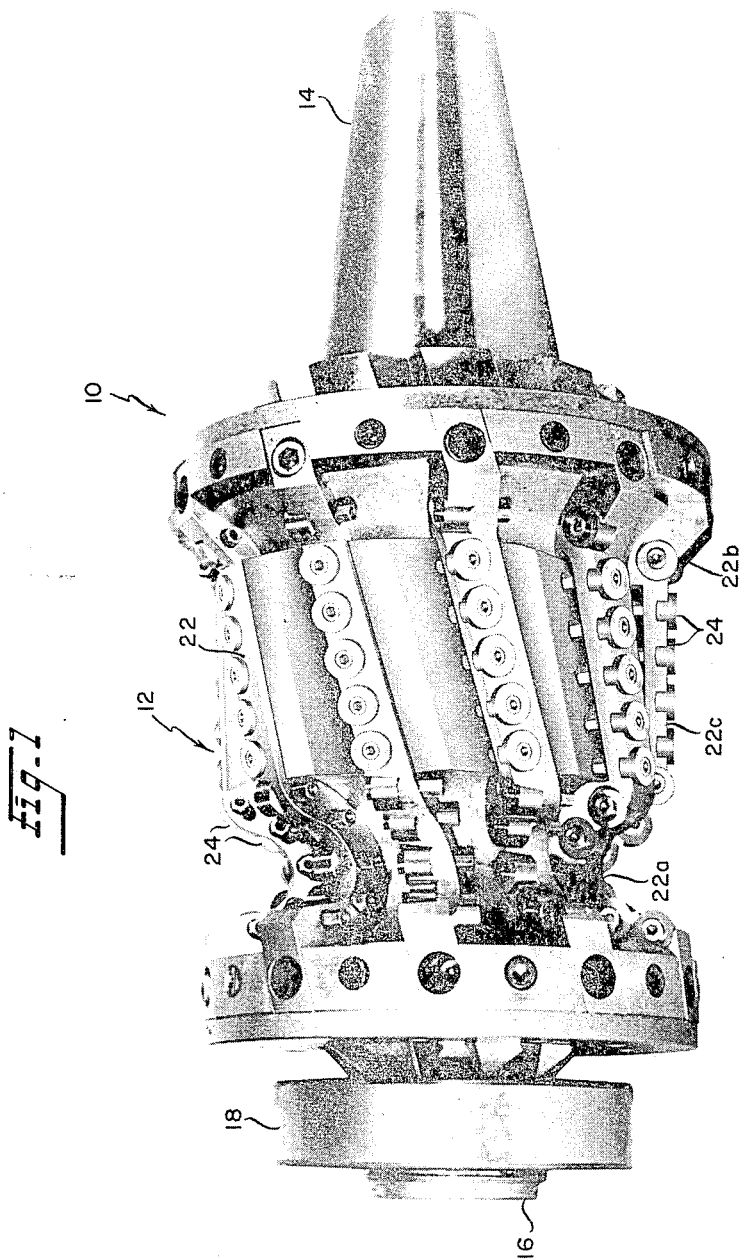

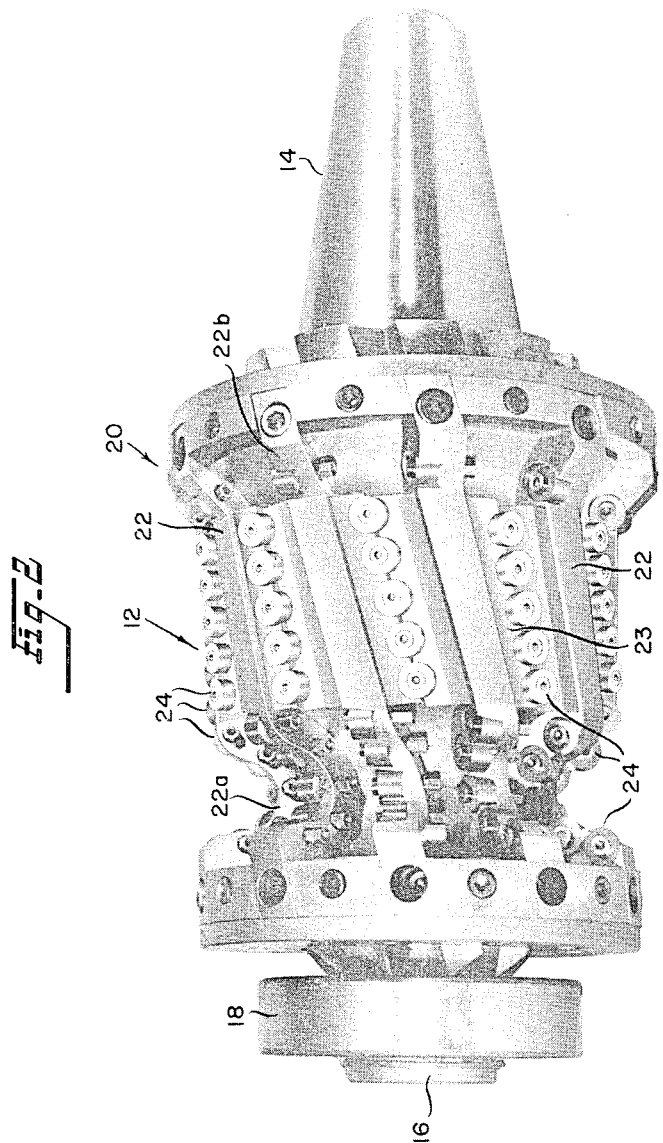

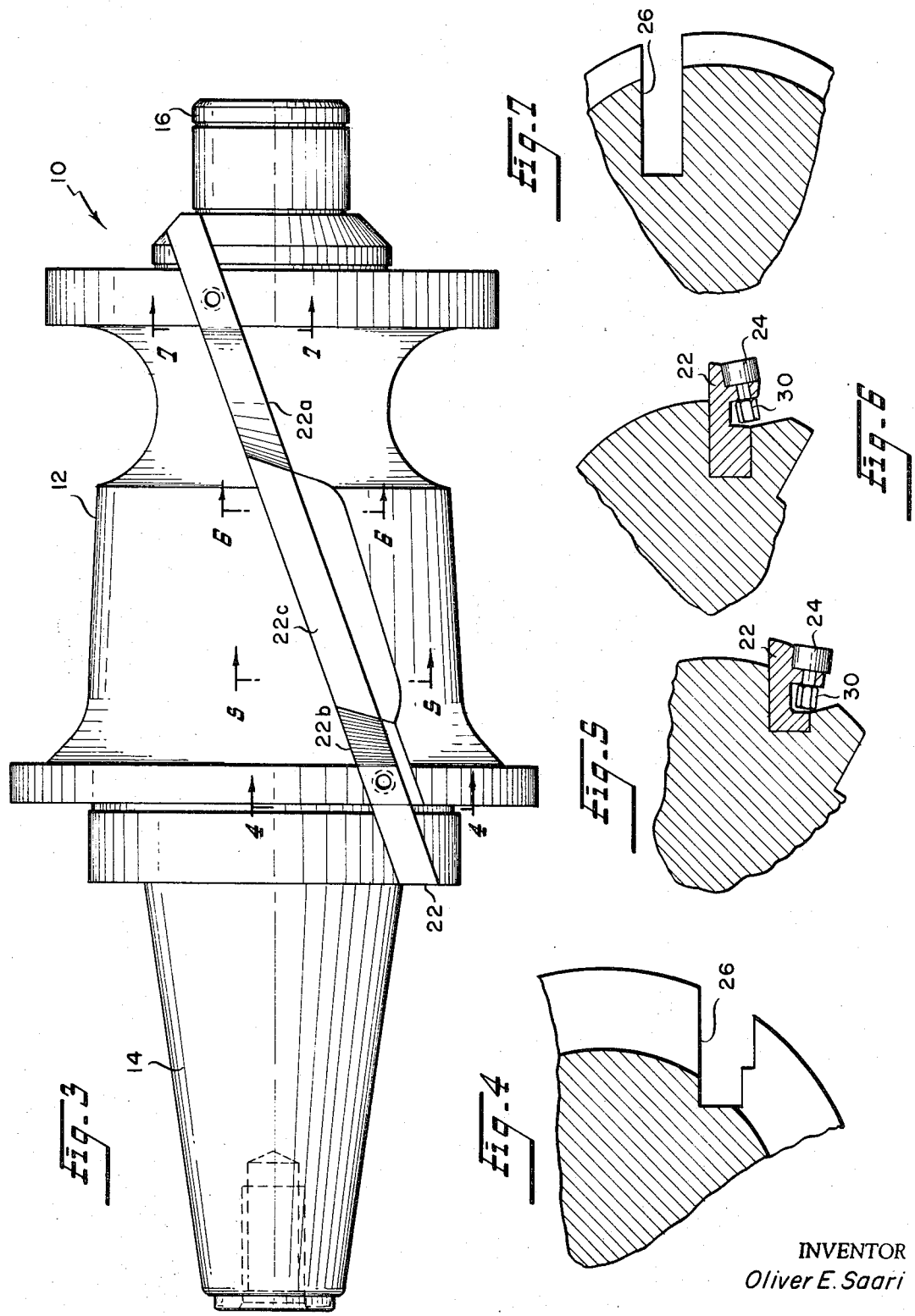

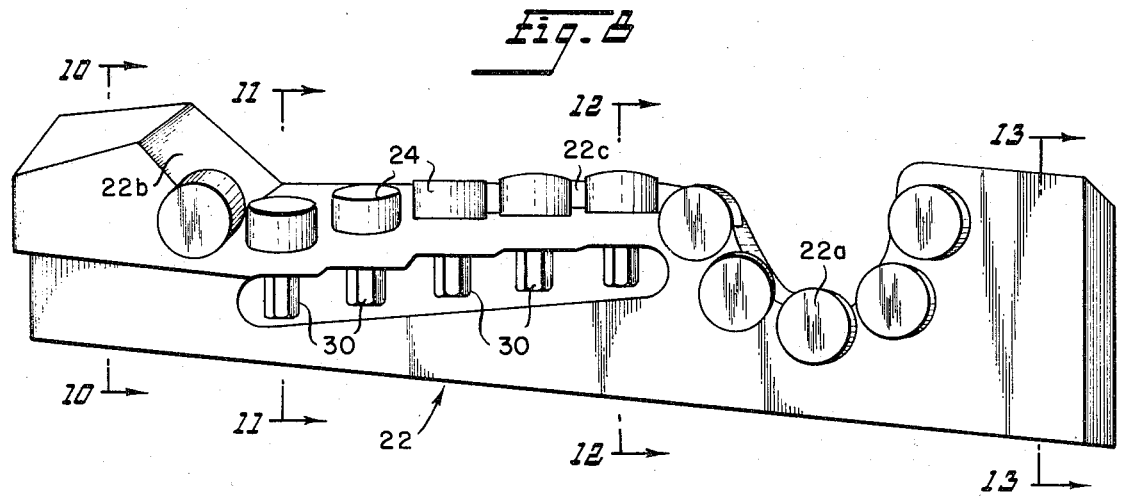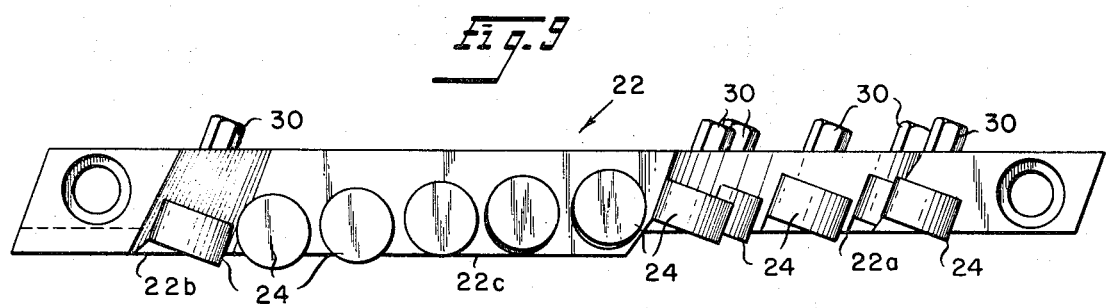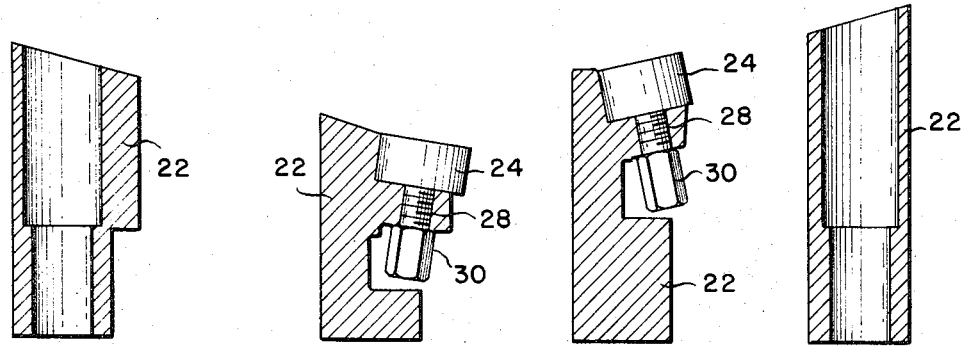

3,540,103
MILLING CUTTER
Oliver E. Saari, Niles, Ill., assignor to Stanray Corporation, Chicago, Ill., a corporation of Illinois
Filed Jan. 30, 1969, Ser. No. 795,781
Int. Cl. B26d 1/12
U.S. Cl. 29—105          13 Claims

ABSTRACT OF THE DISCLOSURE

A milling cutter to be used, for example, in apparatus for truing wheels of a railway vehicle wheel and axle assembly. The cutter has a cylindrical body contoured to the shape of a vehicle wheel or other workpiece, with individual cutting buttons removably fixed to the cutter body in spaced diagonal ranks and with the buttons arranged in the respective ranks to produce a helical progression of individual cuts. The buttons in the wheel flange cutting portion of the cutter body are arranged with their axes substantially normal to a radius of the cutter body, while the buttons in the tread cutting portion are disposed with their longitudinal axes substantially coincident with a radius of the cutter body. The flange cutting buttons may be arranged in ranks which are offset from the rows containing the tread cutting buttons, and the next adjacent buttons in the helical progression may be spaced by staggering the ranks. The cutter body may be contoured to the shape of any workpiece to be milled.

BACKGROUND—SUMMARY—DRAWINGS

The present invention relates to a milling cutter especially useful in truing wheels of railroad cars and locomotives. The cutter is of generally circular cross section and has a helical array of cylindrical cutter buttons mounted on its surface. A typical prior cutter of this type is disclosed and claimed in U.S. Pat. No. 2,645,003 issued July 14, 1953, owned by my assignee. Such a cutter generally comprises a body shaped to conform to the contour of the wheel to be trued, i.e., having a substantially flat tread portion and an arcuate flange portion. The cutter buttons are disposed with their longitudinal axes perpendicular to a radius of the body and are arranged in a number of diagonal ranks so as to form a helical or screw-like array about the surface of the cutter body.

Although such prior cutters have provided adequate performance, it has been discovered that certain modifications therein enhance the performance and result in increased tool life. Accordingly, the present invention includes as one of its principal structural features an improved cutter wherein the cylindrical buttons in the tread cutting portion of the cutter body are rotated approximately 90° so that their longitudinal axes substantially coincide with radii of the body. Further, the buttons in the tread cutting portion may be arranged in ranks which are offset from the rangs containing the flange cutting buttons. Additionally, the spacing of the buttons within each rank may be such that the next adjacent button to a reference button in the helical pattern lies in a rank which is not the next adjacent rank to that containing the reference button. These features result in a decrease of chip thickness for equal chip volume, a lighter chip load for an equal depth of cut, a more uniform distribution of cutting load, and generally smoother machining, as well as the above-mentioned benefits of increased tool life and efficiency.

The foregoing and additional advantages and features of the invention will be more fully appreciated from a consideration of the following detailed description, with reference to the accompanying drawings wherein like reference characters indicate like parts:

FIG. 1 is a perspective view of a cutter illustrating a preferred modification of the present invention;
FIG. 2 is a perspective view of a cutter showing another modification of the invention;
FIG. 3 is a plan view of a cutter head as shown in FIG. 1;
FIG. 4 is a section on the line 4—4 of FIG. 3;
FIG. 5 is a section on the line 5—5 of FIG. 3;
FIG. 6 is a section on the line 6—6 of FIG. 3;
FIG. 7 is a section on the line 7—7 of FIG. 3;
FIG. 8 is a side elevation of a cutter blade as in FIG. 2;
FIG. 9 is a top plan view of FIG. 8;
FIG. 10 is a section on the line 10—10 of FIG. 8;
FIG. 11 is a section on the line 11—11 of FIG. 8;
FIG. 12 is a section on the line 12—12 of FIG. 8; and
FIG. 13 is a section on the line 13—13 of FIG. 8.

DETAILED DESCRIPTION OF EXEMPLARY EMBODIMENT

Referring now to the drawings in detail, it will be noted that FIG. 1 illustrates a cutter 10 which is similar to that shown in FIG. 1 of the aforementioned prior Pat. No. 2,645,003, the primary difference being in the location, the arrangement, and the disposition of the cutter buttons about the periphery of the cutter body. Since it is the cutter buttons which do the work, and each button makes its own increment of cut, it will be understood by those skilled in the art that even a slight change in the location and arrangement of the buttons can make a great difference in effect.

As best seen in FIGS. 1 and 3, the cutter 10 includes a central body 12 with an arbor portion 14 at one end adapted to fit into and be held by a conventional chuck of a milling or truing machine suitable for truing car or locomotive wheels in situ. At the other end of the body 12, a shaft 16 extends outwardly and supports a bearing 18 thereon. The cutter 10 is roughly cylindrical in shape and, as can be seen in FIGS. 4–7, generally circular at any cross section thereof. While I have shown the cutter 10 as having a peripheral contour that conforms to the tread, flange and chamber portions of a railroad car or locomotive wheel, it may be of a shape to conform to the articulation of any workpiece that can be milled by a rotary cutter.

Attached to the body portion 12 by screws or other suitable means are a number of cutter blades 22, each having a plurality of generally cylindrical cutter buttons 24. Each of the blades 22 preferably includes an arcuate flange-cutting portion 22a and an angled chamfer-cutting portion 22b, separated by a relatively flat central tread-cutting portion 22c. As will be described hereinafter in greater detail, the blades 22 are preferably diagonal, or skewed, with respect to the axis of the cutter 10, so that the diagonal ranks of cutter buttons 24 form a helical array of buttons about the periphery of the body 12. The location, spacing and attitude of the individual buttons 24 within the ranks or blades 22 contribute to the enhanced performance and extended life of the present invention.

FIG. 2 illustrates a modified form of cutter 20, which is similar in most respects to the cutter 10 shown in FIG. 1. The principal difference is that in the cutter 20, the central or tread-cutting portions of the blades 22 have been replaced by separate button-bearing blades 23 which are circumferentially offset or staggered from the blades 22. This form of the invention is particularly suitable when it is desired to convert existing prior art cutters to conform herewith. The buttons in the tread-cutting portion of old cutters may simply be removed, and additional blades 23 inserted in the space between the old blades 22.

Referring again to the preferred construction of FIG. 1, it can be seen from FIGS. 4–7 that the blades 22 are disposed in diagonal slots 26 formed in the body 12 of the cutter 10. Recesses are formed in the blades 22 to provide support and stop surfaces for the buttons 24, and the buttons themselves have central apertures for accommodating suitable fastening members, such as screws 28 and nuts 30. The buttons 24 may of course be indexed or replaced as needed.

As best seen in FIGS. 8, 9, 11 and 12, the buttons 24 in the tread-cutting portions 22c of the blades 22 are disposed with their longitudinal axes roughly coincident to radii of the body 12, while the axes of the buttons in the flange- and chamfer-cutting portions 22a and 22b are roughly normal to such radii. Preferably, the axes of the buttons 24 in the tread-cutting portion 22c are within about 10° of coincidence with body radii. It has been found that this angular disposition of the buttons 24 in the tread-cutting portion 22c of the blades 22 results in longer tool life, greater efficiency, and improved performance, particularly in the degree of work finish attainable.

As seen in FIG. 9, the buttons 24 are spaced fairly uniformly along the blade 22 to provide a diagonal rank of buttons, and, as described above, these diagonal ranks form a helical array of buttons around the body 12 of the cutter 10. As is apparent to those familiar with the art, the diameters of the buttons 24 overlap substantially when projected from rank to rank. In this connection, the buttons 24 can preferably be spaced along the blades 22 such that buttons taking adjacent increments of cut in the helical progression do not lie in adjacent blades. And the helical progression can be varied in any desired manner simply by moving the blades 22 to different ones of the slots 26. For example, in an 11-blade cutter, the outermost button in the tread-cutting portion of blade 1 might take the outermost cut on the tread, the corresponding button in the next adjacent blade (blade 2), moving away from the direction of travel of the cutter surface, might take the next adjacent cut, etc., in regular progression 1, 2, 3 . . . 11. However, by varying the location of the blades 22 and/or the position of the buttons 24 thereon, the incremental cut sequence may be altered to any desired progression, as for example 1, 3, 5, 7, 9, 11, 2, 4, 6, 8, 10, etc. In such a progression, the outermost button on blade 1 would take the outermost cut, the outermost button on blade 3 would take the next adjacent cut, and so on, with the outermost button on blade 10 taking the innermost cut for the outermost series of buttons and the second button on blade 1 taking the next adjacent cut thereto, etc. As will be apparent to those of skill in the art, it may be possible to establish staggered progressions, particularly with cutters having even numbers of blades, in which at least a pair of buttons which take adjacent increments of cut do lie in adjacent blades. However, the limitations in the appended claims, to the effect that buttons taking adjacent cuts do not lie in adjacent blades, are not intended to exclude such situations.

It has been found that this staggering of the helical progression with respect to cut increment results in much smoother machining, lower vibration, and generally improved performance.

Although an embodiment constructed in accordance requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

What is claimed is:

1. A cutter comprising a body of substantially circular cross section and a plurality of cutter buttons rigidly associated with the surface of said body, said buttons being arranged in a plurality of spaced ranks to establish a helical array of said buttons about the surface of said body, said buttons being spaced within said ranks such that buttons which are adjacent in said helical array lie in non-adjacent ranks.

2. A cutter in accordance with claim 1 wherein said ranks are skewed with respect to the rotational axis of said body.

3. A cutter in accordance with claim 1, wherein the longitudinal axes of at least a portion of said buttons are substantially coincident with radii of said body.

4. A cutter in accordance with claim 1, wherein the longitudinal axes of at least a portion of said buttons are disposed within 15° of coincidence with radii of said body.

5. A cutter comprising a body of substantially circular cross section and a plurality of cutter buttons arranged in spaced diagonal ranks about the surface of said body, said buttons being spaced within said ranks such that adjacent increments of cut are taken by buttons lying in non-adjacent ranks.

6. A cutter in accordance with claim 5, wherein the longitudinal axes of at least a portion of said buttons are disposed within about 15° of coincidence with radii of said body.

7. A cutter for truing a railway vehicle wheel comprising a body of substantially circular cross section and a plurality of cutter buttons arranged in diagonal ranks on the surface of said body; the surface of said body being substantially congruent with the contour of said wheel and having a flange-cutting portion, a thread-cutting portion and a chamfer-cutting portion; the longitudinal axes of at least those buttons lying in said thread-cutting portion being disposed within 15° of coincidence with radii of said body.

8. A cutter in accordance with claim 7, wherein the buttons in said thread-cutting portion lie in ranks which are circumferentially staggered from the ranks containing the buttons in said flange- and chamfer-cutting portions.

9. A cutter in accordance with claim 7, wherein said buttons are spaced within said ranks such that buttons taking adjacent increments of cut lie in non-adjacent ranks.

10. A cutter in accordance with claim 8, wherein said buttons are spaced within said ranks such that buttons taking adjacent increments of cut lie in non-adjacent ranks.

11. A cutter for truing a railway vehicle wheel comprising a body of substantially circular cross section and a plurality of cutter buttons arranged in diagonal ranks on the surface of said body; the surface of said body being substantially congruent with the contour of said wheel and having a flange-cutting portion, a tread-cutting portion and a chamfer-cutting portion; the buttons in said tread-cutting portion lying in ranks which are circumferentially staggered from the ranks containing the buttons in said flange- and chamfer-cutting portions.

12. A cutter in accordance with claim 11, wherein said buttons are spaced within said ranks such that buttons taking adjacent increments of cut lie in non-adjacent ranks.

13. A cutter for truing a railway vehicle wheel comprising a body of substantially circular cross section and a plurality of cutter buttons arranged in diagonal ranks on the surface of said body; the surface of said body being substantially congruent with the contour of said wheel and having a flange-cutting portion, a tread-cutting portion and a chamfer-cutting portion; said buttons being spaced within said ranks such that buttons taking adjacent increments of cut lie in non-adjacent ranks.

References Cited

UNITED STATES PATENTS

| | | | |
|---|---|---|---|
| 2,645,003 | 7/1953 | Thompson et al. | 29—105 |
| 2,664,617 | 1/1954 | Kralowetz | 29—105 |

HARRISON L. HINSON, Primary Examiner

UNITED STATES PATENT OFFICE
CERTIFICATE OF CORRECTION

Patent No. 3,540,103         Dated November 17, 1970

Inventor(s) Oliver E. Saari

It is certified that error appears in the above-identified patent and that said Letters Patent are hereby corrected as shown below:

Column 1, line 58, change "rangs" to -- ranks --

Column 2, line 48, change "chamber" to -- chamfer --

Column 3, last line, after "accordance", insert

-- with the present invention has been described with the --

SIGNED AND
SEALED
FEB 9 1971

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,540,103          Dated November 17, 1970

Inventor(s) Oliver E. Saari

It is certified that error appears in the above-identified patent and that said Letters Patent are hereby corrected as shown below:

In the heading of the Patent Column 1, line 4, change "Illinois" to ---Delaware---.

Signed and sealed this 25th day of May 1971.

(SEAL)
Attest:

EDWARD M. FLETCHER, JR.          WILLIAM E. SCHUYLER,
Attesting Officer                Commissioner of Patent